Dec. 16, 1947.　　　R. M. SHAW, JR　　　2,432,943
BORING MILL AND MECHANISM TO OPPOSE SAG IN THE TOOL BARS THEREOF
Filed July 8, 1943　　　7 Sheets-Sheet 1
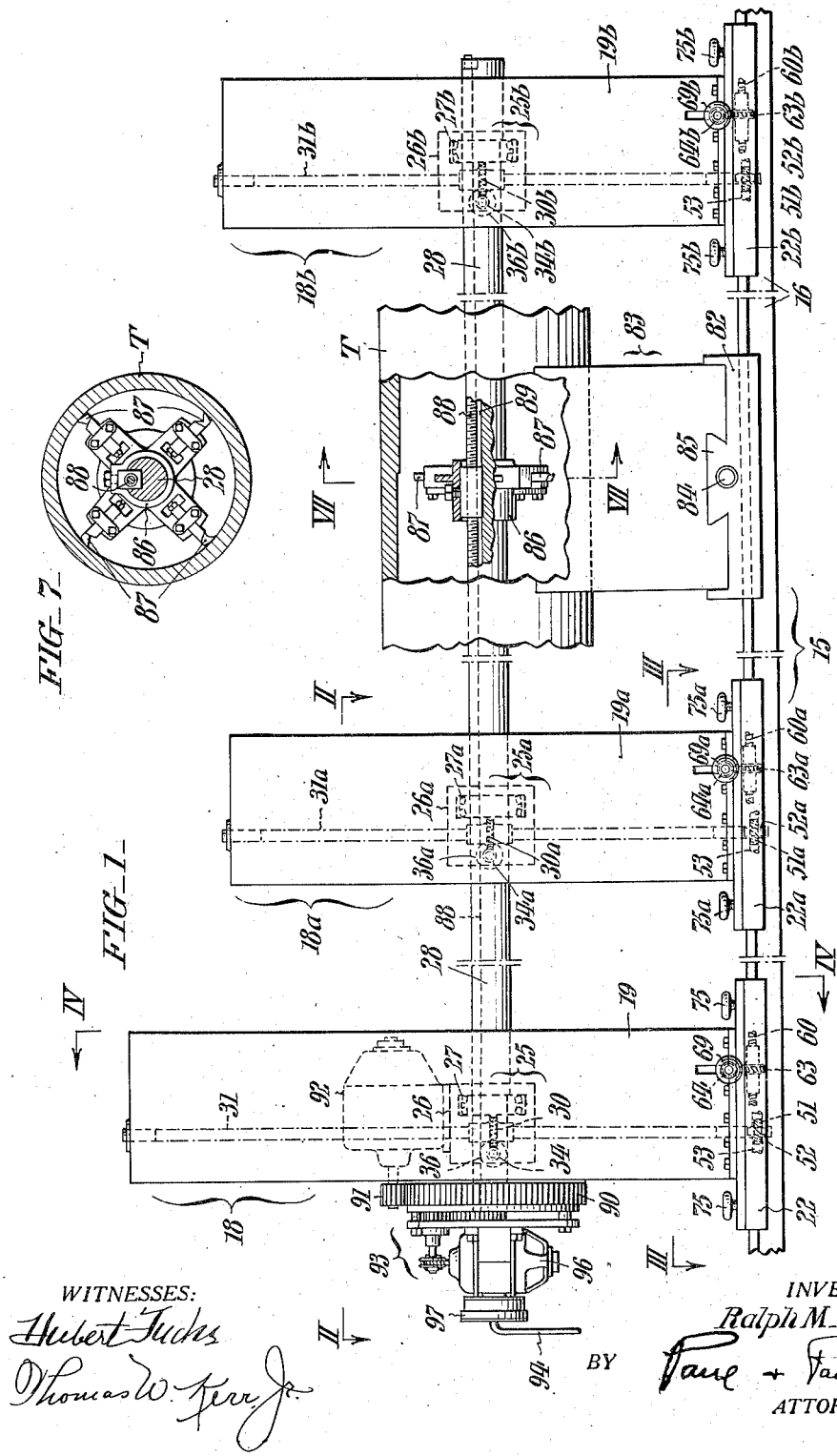

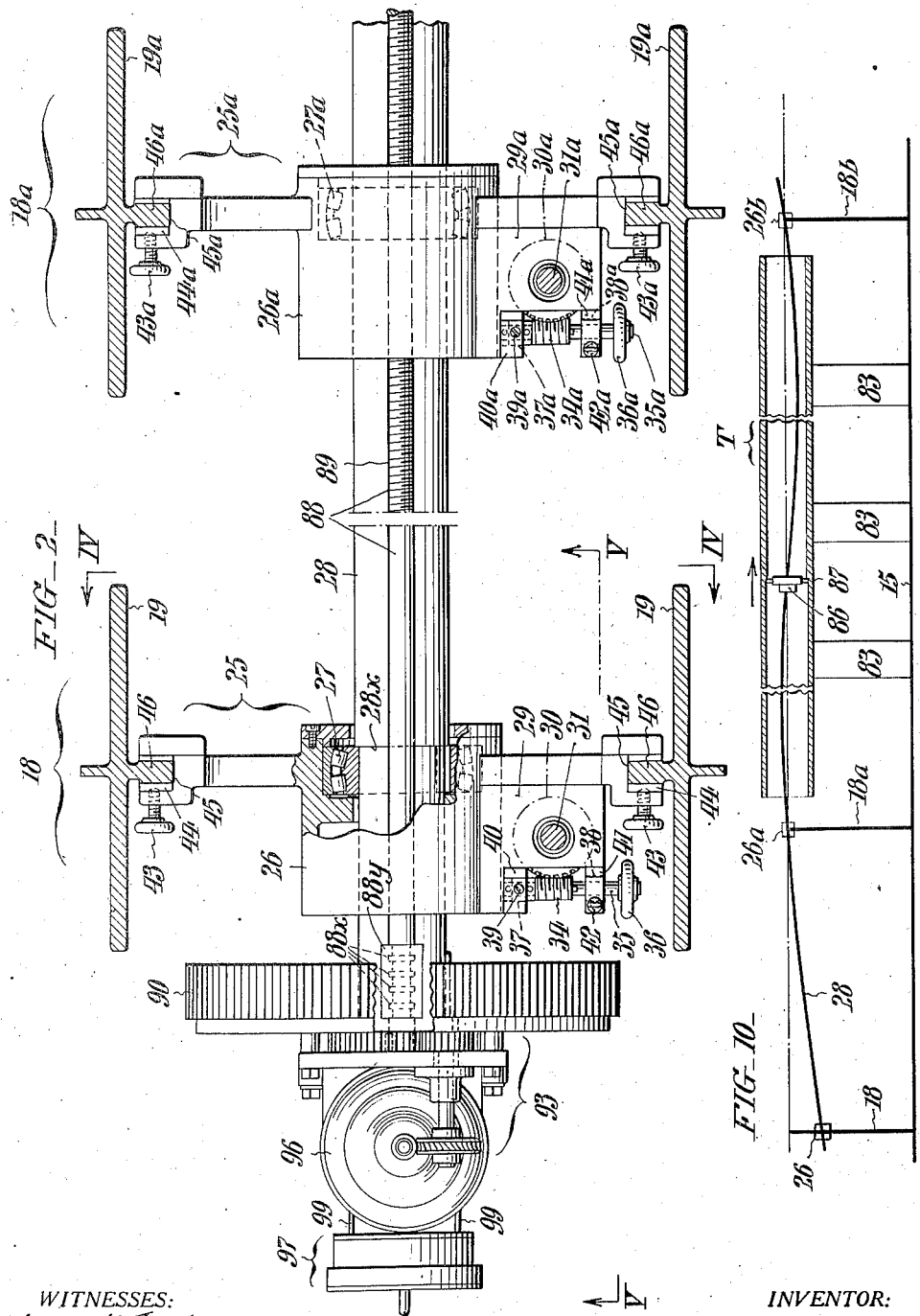

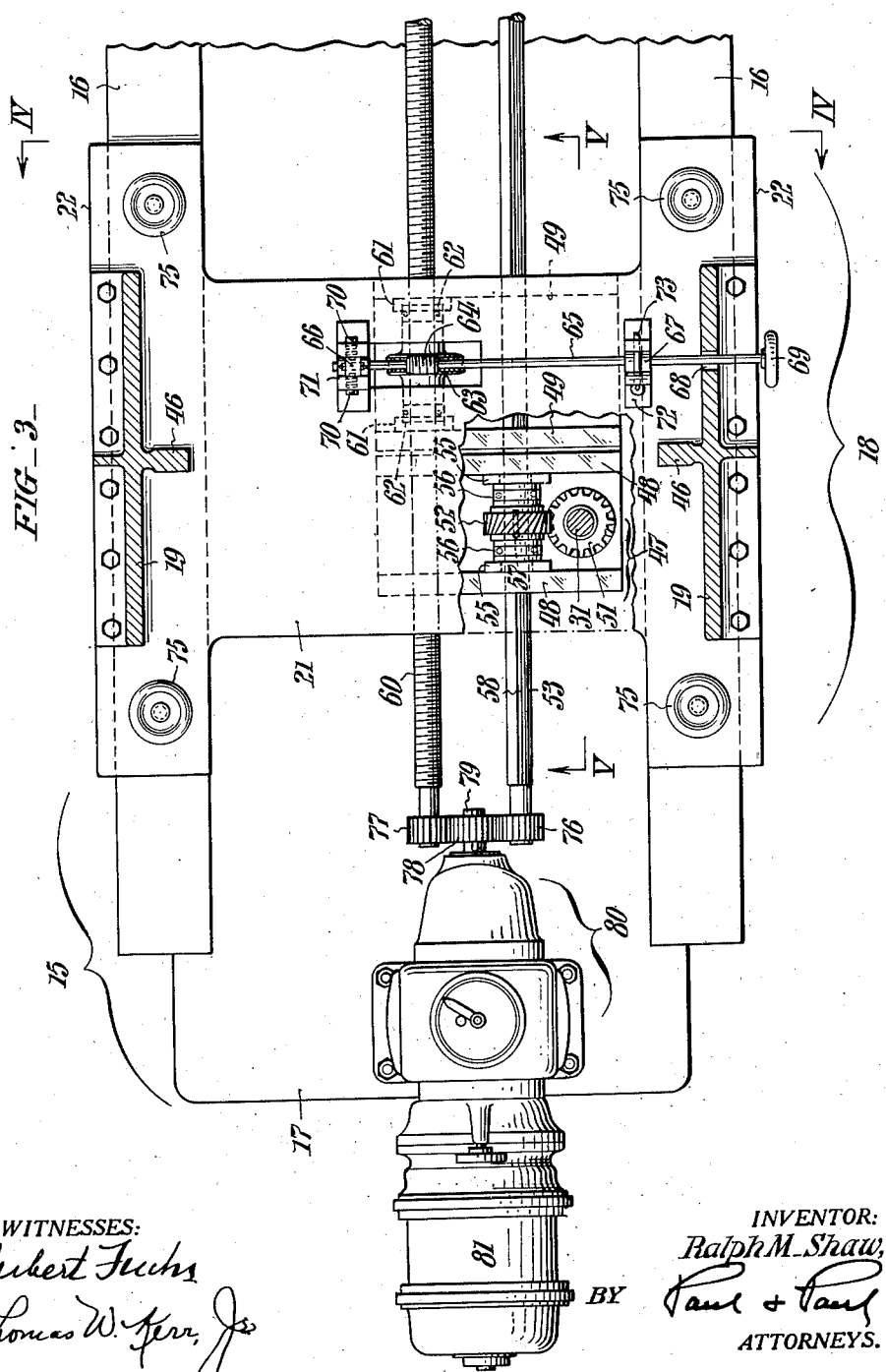

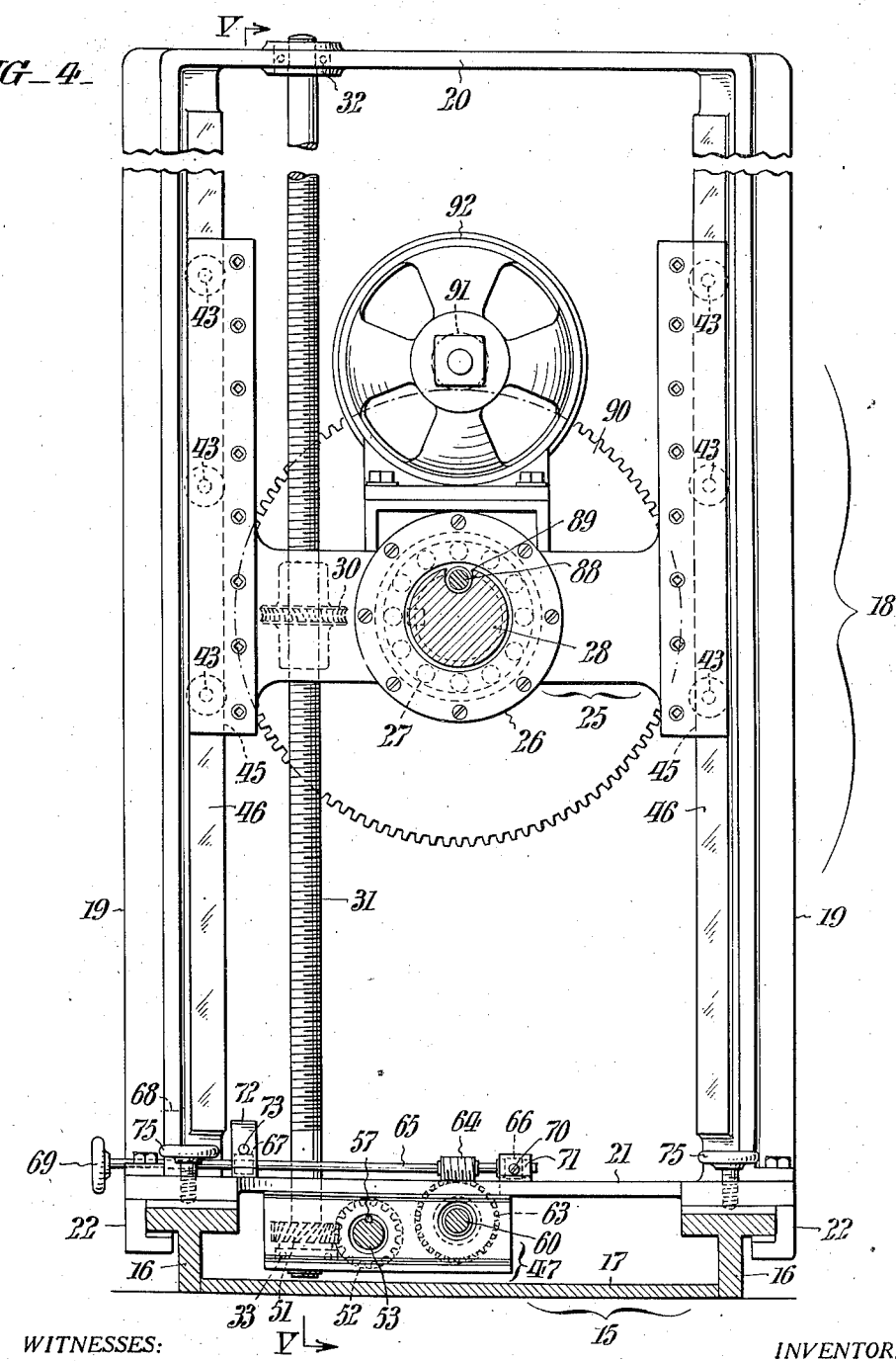

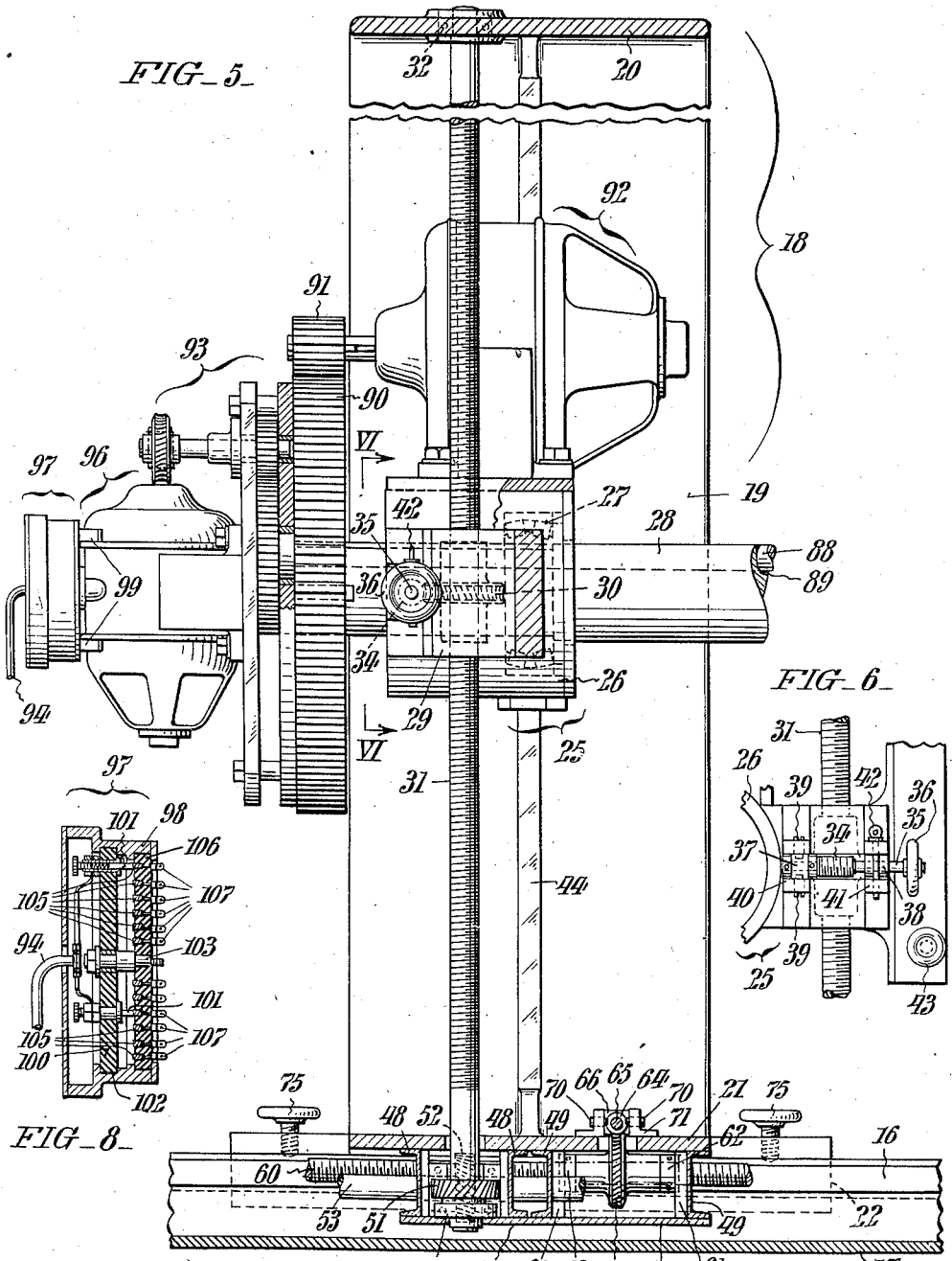

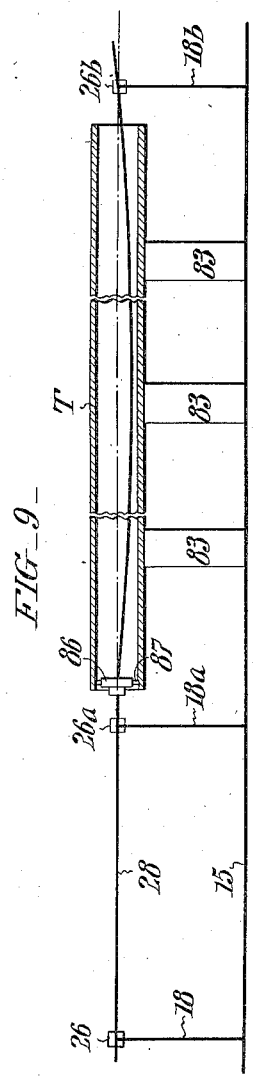
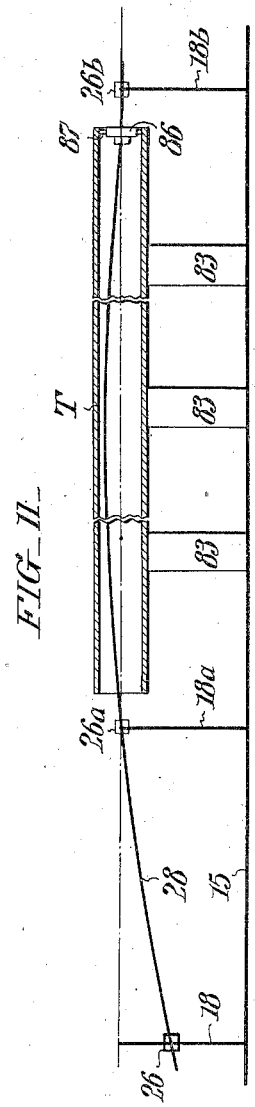

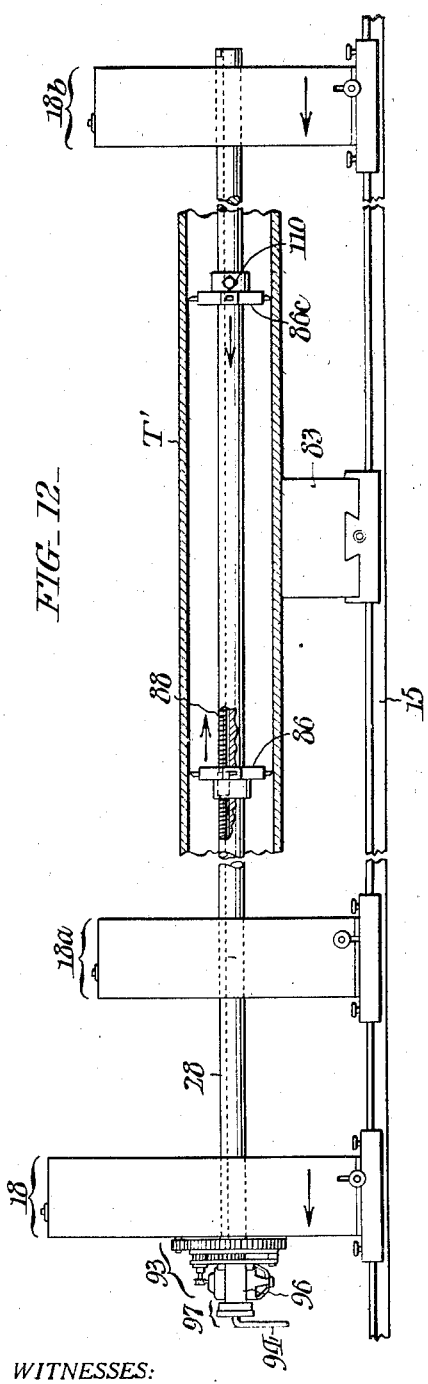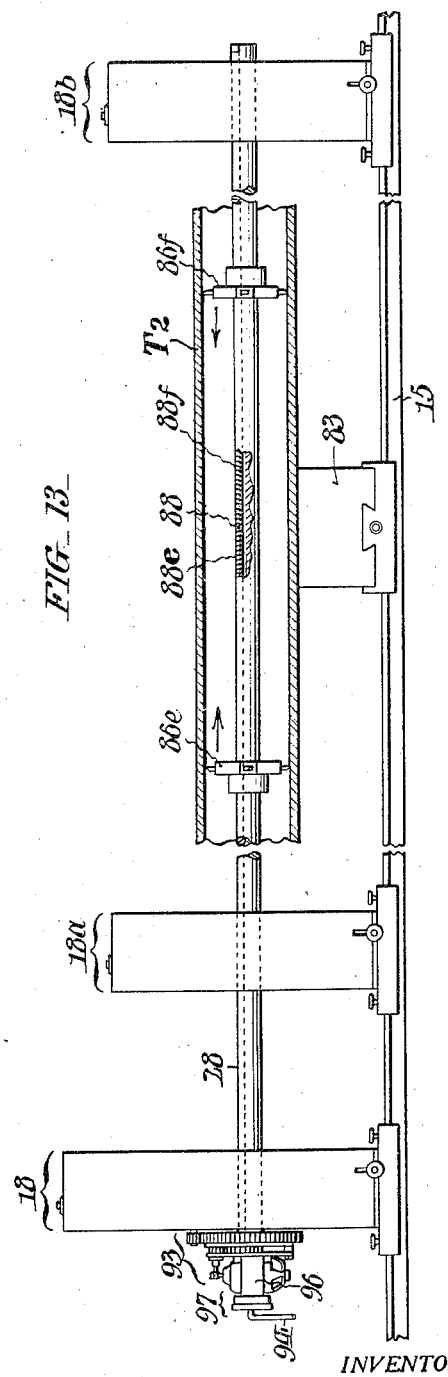

Patented Dec. 16, 1947

2,432,943

UNITED STATES PATENT OFFICE 2,432,943

BORING MILL AND MECHANISM TO OPPOSE SAG IN THE TOOL BARS THEREOF

Ralph M. Shaw, Jr., Edgewater Park, N. J., assignor to Pedrick Tool & Machine Company, Philadelphia, Pa., a corporation of Pennsylvania Application July 8, 1943, Serial No. 493,823

11 Claims. (Cl. 77—3)

This invention is concerned with boring mills and also has to do with improved mechanism to oppose sag in the tool bars thereof.

With mills of the two-column types ordinarily used heretofore for boring operations, difficulty was had in keeping the bore true, particularly in machining relatively long objects such for example as gun barrels, due to the sagging of the bar or shaft along which the cutter head travels between the columns during the boring. Thus in these old forms of boring mills the span between the columns and hence the length of the tubes which could be cut was limited by the degree of permissible sag of the tool shaft, the maximum length of allowable span for a 6 inch tool bar for example in existing mills being approximately 12 feet. To eliminate or minimize sag, various expedients have been heretofore resorted to, such as employing tubular bars or shafts instead of bars or shafts of solid cross section to reduce weight; solidly anchoring the ends of the bars or shafts; providing tiedowns in the form of drawing mechanisms in the plane of the bearings for the bar or shaft; or to have followers move along with the cutting tools in snug engagement with the previously cut portions of the bores to hold the bars centered. The first two mentioned of these prior art schemes could not be relied upon for accuracy, and the last mentioned was objectionable because of the difficulty in disposing of the metal trimmings carried along by the followers withouout attendant scratching or scoring of the machined surface.

The chief aims of my invention are to overcome the above drawbacks and to enable true and accurate boring along absolutely straight lines of objects of much greater length than possible heretofore. These objectives I realize as hereinafter more fully set forth by progressively flexing the tool bar or shaft in such a way as to compensate for variant sag of the span of said bar or shaft between supports or bearings and along which the cutting tool is advanced during the boring; and through the further provision of an improved boring mill which is characterized by having three bearing columns instead of two as in conventional prior art mills, and in which is incorporated regulatable mechanism for progressively flexing the tool bar or shaft at one of the end columns and for concurrently controlling the rate of travel of the tool along the portion of the bar or shaft within the work being machined and spanned between the other two columns, throughout the boring period for attainment of the desideratum above pointed out.

In connection with a boring mill having the foregoing attributes, I aim to enable, through provision of simple and reliable mechanism such as also hereinafter more fully disclosed, rapid adjustment of the columns relative to each other as well as vertical adjustment of the bearings for the tool bar or shaft, either independently or collectively in adapting the mill to accommodate for operation upon objects of different length and/or diameter, and also to enable certain of the columns to be shifted on the mill bed relative to others during the boring under different conditions of use of the mill.

Other objects and attendant advantages will appear from the following detailed description of the attached drawings, wherein Fig. 1 is a fragmentary broken-out view in side elevation of a boring mill conveniently embodying my invention in one form.

Figs. 2 and 3 are fragmentary horizontal sectional views taken as indicated respectively by the angled arrows II—II and III—III in Fig. 1.

Fig. 4 is a cross sectional view taken as indicated by the angled arrows IV—IV in Figs. 1-3.

Fig. 5 is a vertical sectional view taken as indicated by the angled arrows V—V in Figs. 2-4.

Fig. 6 is a fragmentary detail sectional view taken as indicated by the angled arrows VI—VI in Fig. 5.

Fig. 7 is a detail cross sectional view taken as indicated by the angled arrows VII—VII in Fig. 1.

Fig. 8 is a detail view in axial section of a commutator switch associated with the electric drive means of the mill.

Figs. 9, 10 and 11 are diagrammatic views showing successive stages or phases in the method of boring according to my invention.

Figs. 12 and 13 are views in side elevation generally like Fig. 1 but on a smaller scale showing two alternative embodiments of my invention.

With more detailed reference first to Figs. 1-8, the form of my improved mill therein illustrated has an elongate bed 15 with laterally-spaced longitudinally-extending parallel track rails 16 of T-cross section which are connected at their bottoms by a base web 17. Shiftably mounted on the bed 15 are three columns which are respectively designated by the characters 18, 18a and 18b. Except as hereinafter particularly pointed out, these columns are identical both as regards their design and the appurtenances associated with them, and therefore the description which is about to follow of the column 18 will also serve for the columns 18a and 18b. From Figs. 2 and 4 it will be noted that the column 18 is in the form of an open vertically oblong frame with side members 19, an upper transverse member 20, and a lower transverse member 21, the latter having gibs 22 at opposite ends thereof which underreach the outside flanges of the track rails 16.

Guided for up and down adjustment within the opening of the column 18 is a cross head 25 with a hollow central boss 26 which houses a self-aligning spherical roller bearing 27 for the horizontal tool bar or shaft 28 of the mill, the inner race of said ball bearing being secured to said shaft in abutting relation to a shoulder 28x thereon as shown in Fig. 2. Confined against axial movement within a recessed projection 29 (Figs. 2 and 5) at one side of the boss 26 of the cross head 25 is a worm wheel 30 which is rotatable about and which threadedly engages a vertical screw spindle 31 whereof the ends are suitably journaled in ball bearings 32 and 33 at the upper and lower transverse members 20 and 21 of the column 18, see Figs. 2, 5 and 6. The worm wheel 30 is operable by means of an intermeshing worm 34 affixed to a shaft 35 which is provided with a hand wheel 36, and which is journaled adjacent its opposite ends in bearings 37 and 38 (Figs. 2 and 6). As shown the bearing 37 is pivoted to swing laterally about vertical axis studs 39 in a clevis 40 at the front of the projection 29, while the bearing 38 is normally seated in another clevis 41 on said projection with the worm 34 normally engaging the worm wheel 30. A retractible keeper pin 42 serves as a means to lock the bearing 38 within the clevis 41. Thus through the arrangement just described it is possible to vertically adjust the head 25 within the column 18 thereby to raise or lower the tool shaft 28 in accordance with the direction in which the hand wheel 36 is turned. By means of manually-operable screws 43 bearing on clamp shoes 44 lodged within the grooves 45 at opposite ends of the cross head 25 and engaging vertical guide flanges 46 centrally of the side members 19 of the column 18, said cross head is securable against accidental displacement after adjustment.

Pendent from the lower transverse member 21 of the column 18 is a double-chambered housing 47 which is formed by pairs of laterally-spaced, opposingly-arranged crosswise channel pieces 48 and 49 and a bottom plate 50. As best seen in Figs. 4 and 5, the vertical screw spindle 31 extends down into one of the sub-divisions of the housing 47 and is there sustained at that end by the ball bearing 33. Secured to the spindle 31 immediately above the bearing 33 is a spiral gear wheel 51 that mates with a similar wheel 52 (Figs. 3 and 4) on a horizontal shaft 53 which extends longitudinally of the mill substantially throughout the length of the bed 15 and is journaled in bearings 55 on the side channels 48 of the housing 47. As shown in Fig. 3, the spiral gear 52 is confined between ball thrust bearings 56, and within its bore is a key 57 which slidingly engages a lengthwise groove 58 in the shaft 53. Extending parallel with the shaft 53 likewise substantially throughout the length of the bed 15 is a screw spindle 60 which is similarly journaled in bearings 61 on the side channels 49 of the housing 47, and whereon is mounted between thrust bearings 62 within the other sub-division of said housing 47, an internally-threaded inter-engaging worm wheel 63. Arranged to cooperate with the worm wheel 63 is a worm 64 on a crosswise arranged shaft 65 which latter is journaled in bearings 66 and 67 on the transverse lower member 21 of the column and which extends outward through a vertical slot 68 in one of the side members 19 of said column, being provided at its protruding end with a hand wheel 69. The worm 64 is normally in mesh with the worm wheel 63, as shown, so that by turning the hand wheel 69 in one direction or another, the column 18 can be shifted forward or backward along the bed 15. In order that the worm 64 may be lifted out of contact with the worm wheel 63 for a purpose also later on explained, the inner bearing 66 of the shaft 65 is pivotally connected by horizontal axis screw studs 70 in a clevised bracket 71 on the lower transverse member 21 of the column 18, while the outer bearing 67 is lodged in a second clevised bracket 72 on said cross member being normally locked therein by a retractible keeper pin 73. By means of manually-operable clamp screws indicated at 75 the column 18 can be secured against accidental displacement in adjusted positions on the bed 15.

Since a worm gear can be driven by the worm but not by the wheel, the use of such gears in connection with various manual adjustments above described is advantageous since when the worms and the wheels are placed in mesh, the wheels are locked against turning for movement of the columns or bearing heads as the case may be, by the horizontal and vertical screw spindles respectively.

All of the appurtenances thus far described as being associated with the column 18 are duplicated in columns 18a and 18b, and in the latter identified by the same reference numerals previously employed with association however of the letters a and b respectively for convenience of ready distinction. The columns 18a and 18b are thus identical with the column 18 except for being of less height as will be noted from Fig. 1, and in that the inner races of the bearings 27a and 27b are slidably mounted on the tool shaft 28.

As shown in Fig. 3, spur pinions 76 and 77 are secured respectively to the left-hand ends of the longitudinal shaft 53 and the parallel spindle 60, these pinions being in mesh with a driving spur wheel 78 on the output shaft 79 of a variable speed-reducing unit 80, which, and an electric driving motor 81 therefor, are supported on the base plate 17 of the bed.

Mounted on the bed 15 between the columns 18a and 18b with capacity for being independently shifted along the rails 16 is a carriage 82 (Fig. 1) with a pedestal 83 thereon for supporting a tube T or the like which is to be bored, said pedestal being transversely adjustable by means of a screw 84 and having a dovetail guide connection at 85 with said carriage.

The cutting means herein shown by way of example includes a head 86 which carries four radially-arranged cutting tools 87 and which is shiftable along the tool bar or shaft 28 by means of an independently-rotatable feed screw 88 occupying a longitudinal recess 89 in said shaft, see Figs. 4 and 7 also. From Fig. 2 it will be noted that adjacent its left hand end the feed screw 88 is formed with a plurality of spaced thrust collars 88x which are engaged in a thrust bearing 88y recessed laterally into the tool bar or shaft 28. As a consequence of this arrangement, during the boring, the thrust of the feed screw 88 is transmitted to the bar 28 and by the latter to the column 18 through the roller thrust bearing 27. The tool bar or shaft 28 is rotated through a spur gear 90 thereon (Figs. 1 and 4) in mesh with a driving pinion 91 on the shaft of an electric motor 92 which is mounted on the cross head 25. The feed screw 88 is, on the other hand, rotated, through speed-reduction gearing generally designated 93, by a variable-speed electric motor 96 affixed to the spur gear 90 and supplied with electric current through a conductor cable 94. Twisting of the cable 94 as the motor 96 rotates bodily with the gear wheel 90 is prevented through interposition of a commutator switch which is separately illustrated in Fig. 8 and generally designated by the numeral 97. As shown, the commutator switch 97 has its annular housing 98 secured to the casing of the motor 96 by brackets 99. Within the housing 98 is a non-revolving disk 100 of insulation which carries a plurality of spring-pressed brushes 101 (the number corresponding with that of the conductors in the cable 94 and the type of motor 96 employed), and which has its periphery engaged with a working fit in an annular groove 102 of said housing, said disk being additionally supported at its axis by a screw stud 103 taken into the housing of said motor. The brushes 101 frictionally bear against contact rings 105 embedded in another disk 106 of insulation which is fixedly secured to and closes the housing 98 at the inner side of the latter. The taps shown at 107 are for individual connection of the leads (not shown) from the internal wiring of the motor 96.

To prepare the mill for operation, the bearings 26, 26a, 26b are first vertically adjusted in the columns 18, 18a, 18b approximately to the level which the tube to be machined will occupy during the boring, and the spindle 88 is rotated to bring the tool head 86 to a position closely adjacent the column 18a. Column 18b is then shifted rightward on the bed 15 until the corresponding end of the tool bar 28 is cleared and column 18a either at the same time or later shifted to the right or left as may be required, whereupon the tube is applied over said bar and supported on pedestal 83. If more convenient from the standpoint of the previous setting, the last described step can be carried out by backing off the column 18 to draw the bar 28 through the bearing 26a of column 18a, and out of the bearing 26b of column 18b until its end is sufficiently cleared for application of the tube. With the tube properly placed, column 18b is shifted reversely on the bed 15 to re-engage the right-hand end of the bar 28 within its bearing 26b after which the bearings 26a and 26b are again vertically adjusted until all of them accurately center in the axis of the tube. Following this, column 18 is shifted on the bed 15 relative to the column 18a until spaced by a definite distance proportionate to the length of the tube T. The shifting of the columns 18, 18a and 18b can ordinarily be rapidly effected under power by means of the reversible motor 81 by bringing the worms 64, 64a, 64b associated with them individually into mesh with the worm wheels 63, 63a, 63b on the screw spindle 60 as required. After the column 18 has been so shifted, the corresponding worm 64 is disengaged from the associated worm wheel 63 so that the latter can rotate with the screw spindle 60 without causing further movement of said column. A similar procedure is thereupon resorted to in connection with the worms 64a and 64b in order to shift the columns 18a and 18b as may be necessary or desired. The initial vertical adjustment of the bearings 26, 26a, 26b in the columns 18, 18a, 18b is likewise ordinarily effected rapidly under power by means of the motor 81 which through the horizontal shaft 53 actuates the inter-geared vertical screw spindles 31, 31a, 31b in the columns 18, 18a, 18b in one direction or the other as required by selectively meshing the worms 34, 34a, 34b with the worm wheels 30, 30a, 30b respectively. With this accomplished, the worms 34, 34a and 34b are retracted from the wheels 30, 30a and 30b and the motor 81 stopped. Then if finer adjustment of the columns 18, 18a or 18b or of the bearings 26, 26a, 26b should be necessary, this is effected by re-engaging the worms 64, 64a, 64b with the wheels 63, 63a, 63b, and the worms 34, 34a, 34b with the wheels 30, 30a, 30b, and operating them manually. After final adjustment of the parts as just explained, the worms 64, 64a, 64b are again retracted and the clamp screws 75 tightened to fix the columns 18, 18a, 18b against accidental shifting during the boring operation. The worms 34a, 34b are likewise again withdrawn from the worm wheels 30a, 30b, but the worm 34 is left in mesh with the wheel 30 so that the vertical screw spindle 31 may be driven subsequently under power as the boring proceeds for a reason presently disclosed. The set-up after these preparatory steps are completed will be in accordance with the diagram of Fig. 9 with the span of the tool shaft 28 sagging as exaggeratedly shown between the columns 18a and 18b.

All being now in readiness, the mill is operated in the following manner: The motor 92 is first started to rotate the tool shaft 28; whereupon the motors 81 and 96 are simultaneously set into motion, the motor 81 to drive the horizontal shaft 53 and the horizontal spindle 60 in the bed 15 (said spindle rotating idly in the present instance during the boring), the motor 96 being started to drive the feed screw 88 in said tool shaft. As a consequence, the tool head 86 is advanced rightward along the tool shaft 28 within the tube T and the bearing 26 concurrently depressed gradually in the column 18 by action of the vertical screw spindle 31 upon the locked worm wheel 30 on the head 25 to progressively flex the end of the shaft 28 beyond the column 18a. As a result the span of the shaft between said column and the column 18b is caused to assume a compound or sinuous curvature as exaggeratedly shown in Fig. 10 and the node of the curve to travel from left to right in the axis of the tube T. Now if the speed of the drive of the cutter head 86 is adjusted to move said head rightward at the same rate while maintained at the node of the curve, its travel will also be confined to the axis of the tube T and thus cut a bore which will be absolutely straight and true. Upon maximum depression of the bearing 26 in the column 18, the curvature of the span of the shaft 28 will assume an upward or negative catenary sag as shown in Fig. 11, when the cutter head 86 will have reached the far end of the tube T and completed the boring. In practice, it is of course essential that the extent and rate of lowering of the bearing 26a be accurately predetermined mathematically in accordance with the length of the span of the tool shaft between the columns 18a and 18b, and the variable speed drive 80 associated with the motor 81 set to maintain it. The shaft 28 submits readily to being bent and strained as described without binding by reason of being journaled in the self-aligning spherical bearings 27, 27a and 27b in the cross heads of the respective columns 18, 18a and 18b. Thus, through my invention, it is possible to accurately machine much longer tubes than can be done with boring mills of the ordinary types heretofore available. It is to be particularly noted that during the boring the thrust of the tool head 86 is transmitted by the feed screw through the thrust bearing 88y, to the bar or shaft 28, and by the latter, through its shoulder 28x to the roller bearing 27 in the column 18, so that none of such thrust is communicated to the drive mechanism for the feed. This is a distinct advantage over prior art mills wherein the tool bar or shaft is slidable in all the columns and the thrust communicated to the feed mechanism, with causation of severe strains therein and rapid wear of its parts.

Another way in which the mill can be employed is illustrated in Fig. 12 where an additional cutting tool head 86c is made fast to the shaft 28 as by a set screw 110. In this case after the bearings 26, 26a, 26b have been properly adjusted, the worms 34, 34a and 34b are withdrawn and the clamp screws 43 tightened to prevent subsequent displacement of the heads 25, 25a, 25b and hence of the bearings 26, 26a, 26b. The motor 96 is thereupon started and the boring in this instance effected without flexure of the shaft 28. In addition, the hand wheel shaft 65 associated with the column 18a is locked in elevated inoperative position to prevent shifting of said column on the bed 15 by the screw spindle 60 and said column secured in the position in which it is shown. The columns 18 and 18b, on the other hand, are coupled with the screw spindle 60 so as to be concurrently advanced on the bed 15 when the motor 81 is started. Assuming such advance to be as indicated by the arrows on the columns 18 and 18b in Fig. 12, the tool shaft 28 will be bodily shifted axially and slide in the cross head of the column 18a. As a consequence, it will be seen that the cutter head 86c will be advanced from right to left in the tube T, while the cutter head 86 will be concurrently advanced in the opposite direction by the feed screw 88, the latter being of course rotated in the proper direction by the motor 96 to bring this about, and the speed of said motor being set to cause the head 86 to be advanced at such a rate with respect to the axial shifting of the shaft 28 that the two heads will eventually meet mid-way of the length of said tube. Duplex boring in this way will obviously be more rapid than by the first described use of the press and can be resorted to whenever the character of the work will permit it.

Fig. 13 shows a modified arrangement in which the end portions of the feed shaft 88 are oppositely-threaded as at 88e and 88f to act respectively on the cutter heads 86e and 86f. As in the first described instance, the columns 18, 18a and 18b are all secured against shifting on the bed after having been properly positioned with relation to the tube T² which is to be machined, and the boring effected simply by rotation of the feed screw 88. Due to the reversely-pitched threads of the feed screw 88, it will be apparent that as the latter is differentially rotated in respect to the shaft 28, the cutter heads 86e and 86f will gradually approach each other until they eventually meet mid-way of the length of the tube T². As in the case of the apparatus of Fig. 12, the boring is effected without flexure of the shaft.

Having thus described my invention, I claim:

1. In a boring mill, a pair of spaced columns; means for horizontally supporting a tube which is to be bored in the interval between said columns; a tool shaft supported axially within the tube by bearings on said columns with one end projecting beyond one of the columns; a third column with a vertically-movable bearing in which the projecting end of the shaft is engaged; and means for moving the bearing in said third column to variantly flex the projecting end of the shaft and so compensate for sagging of that portion of the shaft within the tube as the tool is advanced therealong.

2. A boring mill according to claim 1, in which the bearings on all three columns are of a spherical type to facilitate flexing of the shaft.

3. In a boring mill, a pair of columns; a support for a tube disposed between the two columns; a cutter tool shaft; bearings on said column in which the shaft is slidable endwise; a third column with a thrust bearing thereon in which an outboard end of the shaft is fixed against endwise sliding; a bed on which the columns are supported; and means for shifting said third column along the bed relative to the first two columns to insert the shaft into or to withdraw it from the tube.

4. A boring mill characterized as in claim 3, further including means whereby the two columns first mentioned can be shifted along the bed independently of each other and of the third column.

5. A boring mill characterized as in claim 3, further including a feed screw for shifting the tool along the shaft during the boring; and means on the shaft for taking the thrust of the feed screw.

6. A boring mill characterized as in claim 3, in which the bearings of the two columns first mentioned are spherical; and further including means for progressively moving the thrust bearing in the third column vertically to flex the outboard end of the shaft in order to compensate for the weight of the tool in its travel along said shaft and maintaining it coaxial with the tube during the boring.

7. A boring mill characterized as in claim 3, further including means whereby the bearings in the respective columns can be simultaneously adjusted vertically to initially center the tool shaft within the tube.

8. A boring mill characterized as in claim 3 wherein the column shifting means includes a rotary screw spindle which extends longitudinally of the bed, nut means for engaging the screw spindle held against axial movement on the respective columns, and means whereby said nut means can be independently locked against rotation when the corresponding columns are to be shifted.

9. A boring mill characterized as in claim 3, wherein the bearings of the two columns first mentioned are spherical; and further including power means on the third column for progressively advancing the cutting tool along the shaft during the boring and at the same time progressively moving the thrust bearing vertically to flex the outboard end of the shaft in order to compensate for the weight of the tool as it is moved along and thereby maintaining it coaxial within the tube.

10. In a boring mill, a pair of columns; a support for a tube disposed between the two columns; a cutter tool shaft; bearings on said columns in which the shaft is slidable endwise; a third column with a thrust bearing thereon in which an outboard end of the shaft is held against endwise sliding; a bed on which the columns are supported; a cutting tool secured to the shaft; a second cutting tool capable of being advanced along the shaft; means for moving the third column relative to the other two on the bed to shift the shaft and thereby cause the fixed tool to travel lengthwise of the tube during the boring; and means for concurrently advancing the movable tool along the shaft in the opposite direction.

11. In a boring mill, a pair of spaced columns; means for supporting a tube or the like to be bored, in the interval between said columns; spherical bearings in the respective columns; a shaft rotative in the bearings and projecting beyond one of them; a cutting tool movable along the shaft; and means for variantly flexing the projecting end of the shaft to compensate for sagging in the portion thereof between the columns as the tool is advanced therealong.

RALPH M. SHAW, Jr.

REFERENCES CITED

The following references are of record in the file of this patent:

UNITED STATES PATENTS

| Number | Name | Date |
|---|---|---|
| 143,917 | MacDonald | Oct. 21, 1873 |
| 384,581 | Julien | June 12, 1888 |
| 419,071 | Richards | Jan. 7, 1890 |
| 428,703 | Taylor | May 27, 1890 |
| 767,312 | Otis | Aug. 9, 1904 |
| 995,572 | Rowe | June 20, 1911 |
| 1,434,004 | Greven | Oct. 31, 1922 |
| 1,490,783 | Pedrick | Apr. 15, 1924 |
| 2,170,054 | Jeschor | Aug. 22, 1939 |
| 2,315,877 | Snyder | Apr. 6, 1943 |
| 2,375,172 | Arter | May 1, 1945 |
| 2,383,901 | Werner | Aug. 28, 1945 |

FOREIGN PATENTS

| Number | Country | Date |
|---|---|---|
| 234,069 | Germany | May 1, 1911 |
| 234,273 | Germany | May 5, 1911 |